US011383699B2

(12) United States Patent
Woo et al.

(10) Patent No.: US 11,383,699 B2
(45) Date of Patent: Jul. 12, 2022

(54) VEHICLE PARKING

(71) Applicant: Ford Global Technologies, LLC, Dearborn, MI (US)

(72) Inventors: Jason Joseph Woo, Northville, MI (US); Jae Hyung Lim, Canton, MI (US); Jeremy Lerner, Oak Park, MI (US)

(73) Assignee: FORD GLOBAL TECHNOLOGIE, LLC, Dearborn, MI (US)

( * ) Notice: Subject to any disclaimer, the term of this patent is extended or adjusted under 35 U.S.C. 154(b) by 417 days.

(21) Appl. No.: 16/595,812

(22) Filed: Oct. 8, 2019

(65) Prior Publication Data

US 2021/0101586 A1   Apr. 8, 2021

(51) Int. Cl.
*B60W 30/06* (2006.01)
*G08G 1/14* (2006.01)

(52) U.S. Cl.
CPC .............. *B60W 30/06* (2013.01); *G08G 1/14* (2013.01)

(58) Field of Classification Search
CPC ................................ B60W 30/06; G08G 1/14
USPC ........................................................ 701/26
See application file for complete search history.

(56) References Cited

U.S. PATENT DOCUMENTS

| 8,542,129 | B2 | 9/2013 | Taniguchi et al. | |
| 9,511,800 | B2 | 12/2016 | Lee et al. | |
| 10,268,905 | B2 | 4/2019 | Konishi | |
| 10,286,904 | B2* | 5/2019 | Yaldo | H04W 4/46 |
| 10,821,972 | B2* | 11/2020 | Krekel | B60W 40/08 |
| 2020/0298835 | A1* | 9/2020 | Suzuki | G05D 1/0225 |

FOREIGN PATENT DOCUMENTS

| DE | 102014210043 A1 | 10/2015 |
| GB | 2491720 A | 12/2012 |

* cited by examiner

*Primary Examiner* — Peter D Nolan
*Assistant Examiner* — Luke Huynh
(74) *Attorney, Agent, or Firm* — Frank A. MacKenzie; Bejin Bieneman PLC (57) ABSTRACT

A parking space can be identified. A lateral clearance can be identified when a vehicle is parked in the parking space based on identifying a first door of the vehicle to be provided the lateral clearance when the vehicle is parked. A parking position of the vehicle in the parking space can be determined, including a parking bias angle β between a vehicle longitudinal axis and a parking space longitudinal center axis, and a lateral offset of the vehicle with respect to the parking space longitudinal center axis, based on dimensions of the parking space and the lateral clearance.

20 Claims, 7 Drawing Sheets

VEHICLE PARKING

BACKGROUND

Vehicles can be equipped with park assist systems that assist in identifying a suitable parking space and maneuvering the vehicle into the parking space. For example, a vehicle computer can be programmed to receive data from vehicle sensors and, based on such data, to maneuver the vehicle to park in a parking space.

DETAILED DESCRIPTION

A computing device comprises a processor and a memory, the memory storing instructions executable by the processor such that the computing device is programmed to identify a parking space; identify a lateral clearance when a vehicle is parked in the parking space based on identifying a first door of the vehicle to be provided the lateral clearance when the vehicle is parked; and determine a parking position of the vehicle in the parking space, including a parking bias angle $\beta$ between a vehicle longitudinal axis and a parking space longitudinal center axis, and a lateral offset of the vehicle with respect to the parking space longitudinal center axis, based on dimensions of the parking space and the lateral clearance.

The computing device can be further programmed to determine the dimension of the parking space from vehicle sensor data detecting a longitudinal boundary of the parking space. The computing device can be further programmed to determine the parking bias angle $\beta$ based on detecting an object on a different side of the longitudinal boundary of the parking space from a side of the longitudinal boundary of the parking space in which the vehicle is to be parked.

The lateral clearance can be specified for one of a plurality of door-openings in the vehicle. The computing device can be further programmed to determine the lateral clearance based on a door-opening distance selected from a plurality of door-opening distances. The computing can be further programmed to determine the lateral clearance based on at least one of a stored user preference or an occupant location within the vehicle.

The computing device can be further programmed to determine the angle $\beta$ based on a ratio of the lateral clearance to a longitudinal distance that is based on a length of the vehicle and a longitudinal clearance. The longitudinal distance can be calculated as sum of (1) a distance from a portion of the length of the vehicle extending from a point shared with the lateral clearance to a front or rear edge of the vehicle and (2) the longitudinal clearance. A line including the longitudinal distance can be perpendicular to a line including the lateral clearance. The line including the longitudinal distance can be parallel to a longitudinal axis of the vehicle.

The computing device can be further programmed to determine the angle $\beta$ based on iteratively determining respective ratios of respective lateral clearances and longitudinal distances. One of the angle $\beta$ can be nonzero and the lateral offset can be zero.

The parking position can include parking the vehicle one of front-first and rear-first in the parking space. The computing device can be further programmed to actuate one or more components in the vehicle to park the vehicle at the parking position.

A method comprises identifying a parking space; identifying a lateral clearance when a vehicle is parked in the parking space based on identifying a first door of the vehicle to be provided the lateral clearance when the vehicle is parked; and determining a parking position of the vehicle in the parking space, including a parking bias angle $\beta$ between a vehicle longitudinal axis and a parking space longitudinal center axis, and a lateral offset of the vehicle with respect to the parking space longitudinal center axis, based on dimensions of the parking space and the lateral clearance.

The method can further comprise determining the dimension of the parking space from vehicle sensor data detecting a longitudinal boundary of the parking space. The method can further comprise determining the parking bias angle $\beta$ based on detecting an object on a different side of the longitudinal boundary of the parking space from a side of the longitudinal boundary of the parking space in which the vehicle is to be parked.

The method can further comprise determining the angle $\beta$ based on a ratio of the lateral clearance to a longitudinal distance that is based on a length of the vehicle and a longitudinal clearance. The longitudinal distance can be calculated as sum of (1) a distance from a portion of the length of the vehicle extending from a point shared with the lateral clearance to a front or rear edge of the vehicle and (2) the longitudinal clearance. A line including the longitudinal distance can be perpendicular to a line including the lateral clearance.

Parking spaces may have limited lateral clearance. A parking space has limited lateral clearance when the distance from a side of a vehicle to another object or objects, such as a wall, fence, barrier, post, one or two adjacent vehicles or some other object impairs or prevents occupant ingress and egress into and from that side of the vehicle. Occupant ingress and egress can be impaired or prevented because of the occupant himself/herself and/or because the limited lateral clearance does not accommodate the entire door open distance of a vehicle door.

Figure 1:
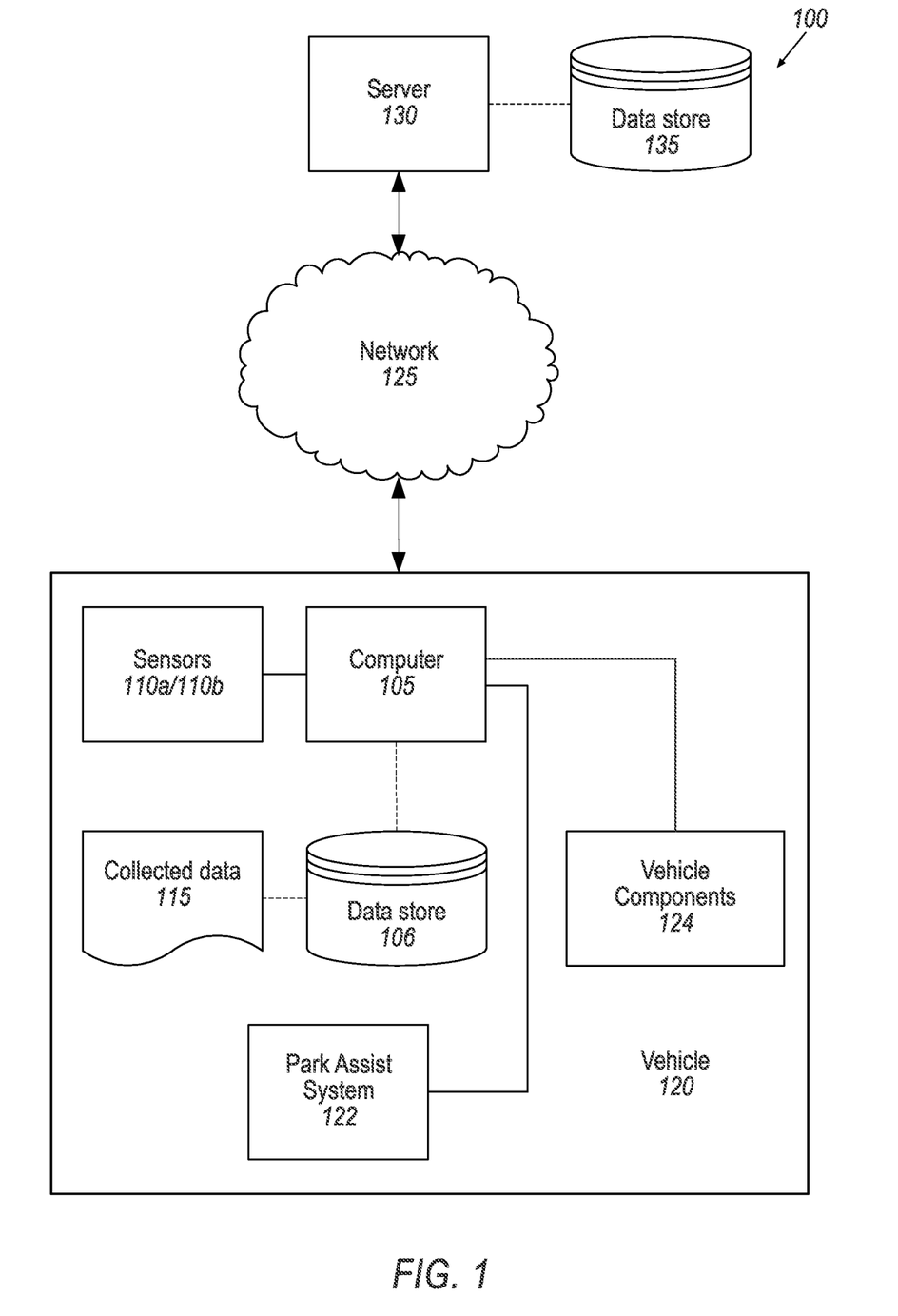
FIG. 1 is a block diagram of an example park assist system.

FIG. 1 illustrates an example system 100 for determining a biased parking position within a parking space 310 (see FIGS. 3A-3C) for a vehicle 120 to improve occupant ingress and egress. The vehicle 120 includes a computer 105 comprising a processor and a memory. The memory of computer 105 may store one or more instructions executable by the processor and pertaining to the operation of the vehicle, the component, a system, or any combination thereof. While only one computer 105 is shown for ease of illustration, it is to be understood that the vehicle 120 can include a plurality of computers. The computer 105 may be included in or be communicatively coupled (via a vehicle communications network such as a communications bus as described below) to a park assist system 122 included in the vehicle.

The computer 105 may operate the vehicle in an autonomous, a semi-autonomous mode, or a non-autonomous (or manual) mode. For purposes of this disclosure, an autonomous mode is defined as one in which each of vehicle propulsion, braking, and steering are controlled by the vehicle computer 105; in a semi-autonomous mode the computer 105 controls one or two of vehicle propulsion, braking, and steering; in a non-autonomous mode a human operator controls each of vehicle propulsion, braking, and steering.

The computer 105 can be programmed to receive collected data 115 from, e.g., one or more sensors 110. Collected data 115 is typically available from a vehicle controller area network (CAN) bus or the like. In general, collected data 115 may include data about operation of the vehicle, data about one or more vehicle components, as well as data about a location of the vehicle, data about an exterior environment around a vehicle, data about an interior environment of the vehicle, etc. A vehicle location is typically provided in a conventional form, e.g. geo-coordinates such as latitude and longitude coordinates obtained via a navigation system that uses the Global Positioning System (GPS). Further examples of collected data 115 can include parking space measurements, etc. as described below. In general, collected data 115 may include any data that may be gathered by the sensors 110 and/or computed from such data. The data store 106 can be of any type, e.g., hard disk drives, solid state drives, servers, or any volatile or non-volatile media. The data store 106 can store the collected data 115 sent from the sensors 110. The data store 106 can also store preferences for a door 207 that opens and closes a door-opening 206 (FIG. 2) of the vehicle 120 to have a greater lateral clearance within the parking space relative to another door-opening 206/door 207 when the vehicle 120 is parked within a parking space 310 as described below. The preferences can be received via a human machine interface (HMI).

The computing device (i.e., computer 105) is generally programmed for communications on a vehicle communications network, e.g., including a conventional vehicle communications bus. Via the network (such as a controller area network (CAN) or the like, bus, and/or other wired and/or wireless mechanisms (e.g., a wired or wireless local area network in the vehicle), devices 105 may transmit messages to each other and/or to other various devices in the vehicle 120 and/or receive messages from the various devices, e.g., sensors 110, actuators, a human machine interface (HMI), etc. Alternatively, or additionally, in cases where the device 105 actually comprises multiple devices, the vehicle communication network may be used for communications between devices represented as the computer 105 or other computing devices in the vehicle 120, such as electronic control units and the like. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc. Various devices such as electronic control units in a vehicle 120 may provide data 115 to computer 105 and/or other electronic control units via the vehicle network or bus.

Vehicle sensors 110a and 110b may include a variety of devices such as are known to output sensor data to the computer 105 and/or the data store 106. Non-limiting examples of vehicle sensors 110a, 110b include radar sensors, Light Detection and Ranging (LIDAR) sensors, global positioning systems, camera sensors, ultrasonic transducers, etc. The data store 106 may be included in the computer 105 or separate therefrom. Sensors 110a can sense observable conditions indicative of the exterior environment of the vehicle 120 and sensors 110b can sense observable conditions indicative of the interior environment of the vehicle 120.

For example, vehicle sensors 110a that sense observable conditions indicative of the exterior environment may include Light Detection and Ranging (LIDAR) sensor(s), etc., disposed on a top of the vehicle, behind a vehicle front windshield, around the vehicle 120, etc., that provide relative locations, sizes, and shapes of objects surrounding the vehicle 120. As another example, one or more radar sensors fixed to vehicle bumpers may provide data to provide locations of objects relative to the location of the vehicle 120. The vehicle sensors 110a may further alternatively or additionally, for example, include camera sensor(s), e.g. front view, side view, etc., providing images from an area surrounding the vehicle 120. An object is a physical, i.e., material, item, i.e., that can be represented by physical phenomena (e.g., light or other electromagnetic waves, or sound, etc.) detectable by sensors. The vehicle sensors 110a can be used to detect the presence or absence of objects such as obstacles, pedestrians, and other vehicles around the parking vehicle 120 including adjacent vehicles 320 (FIGS. 3A-3C) parked in adjacent parking space(s), the positions of the objects, and the distances to the objects.

Vehicle sensors 110b that sense observable conditions indicative of the interior environment can include door ajar sensors 110b-1 through 110b-4 (FIG. 2), seat belt sensors, etc. At least one of the door ajar sensors may be disposed at each door 207a through 207d of the vehicle 120, where the total number of door ajar sensors 110b typically corresponds to the number of doors. The vehicle sensors 110b that sense the interior environment can be used to output sensor data indicative of the occupant location within the vehicle 120 as described below.

The vehicle 120 can include a plurality of vehicle components 124 that include, are monitored, and/or controlled by an electronic control unit such as mentioned above. In this context, each vehicle component 124 includes one or more hardware components adapted to perform a mechanical function or operation—such as moving the vehicle 120, slowing or stopping the vehicle 120, steering the vehicle 120, etc. Non-limiting examples of components 124 include a propulsion component (that includes, e.g., an internal combustion engine and/or an electric motor, etc.), a transmission component, a steering component (e.g., that may include one or more of a steering wheel, a steering rack, etc.), a suspension component, a brake component (as described below), a park assist component, an adaptive cruise control component, an adaptive steering component, a movable seat, a vehicle body 202 (FIG. 2), and the like. Sensors 110 and actuators can also be considered vehicle components 124.

The system 100 can further include a wide area network 125 connected to a server 130 and a data store 135. The computer 105 may be configured for communicating with one or more remote sites such as a server, via a network, such remote sites possibly including a data store. The network 125 represents one or more mechanisms by which a vehicle computer 105 may communicate with a remote server. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, Dedicated Short Range Communications (DSRC), Cellular Vehicle-to-Everything Communication (CV2x) etc.), local area networks (LAN) and/or wide area networks (WAN), including the Internet, providing data communication services.

Figure 2:
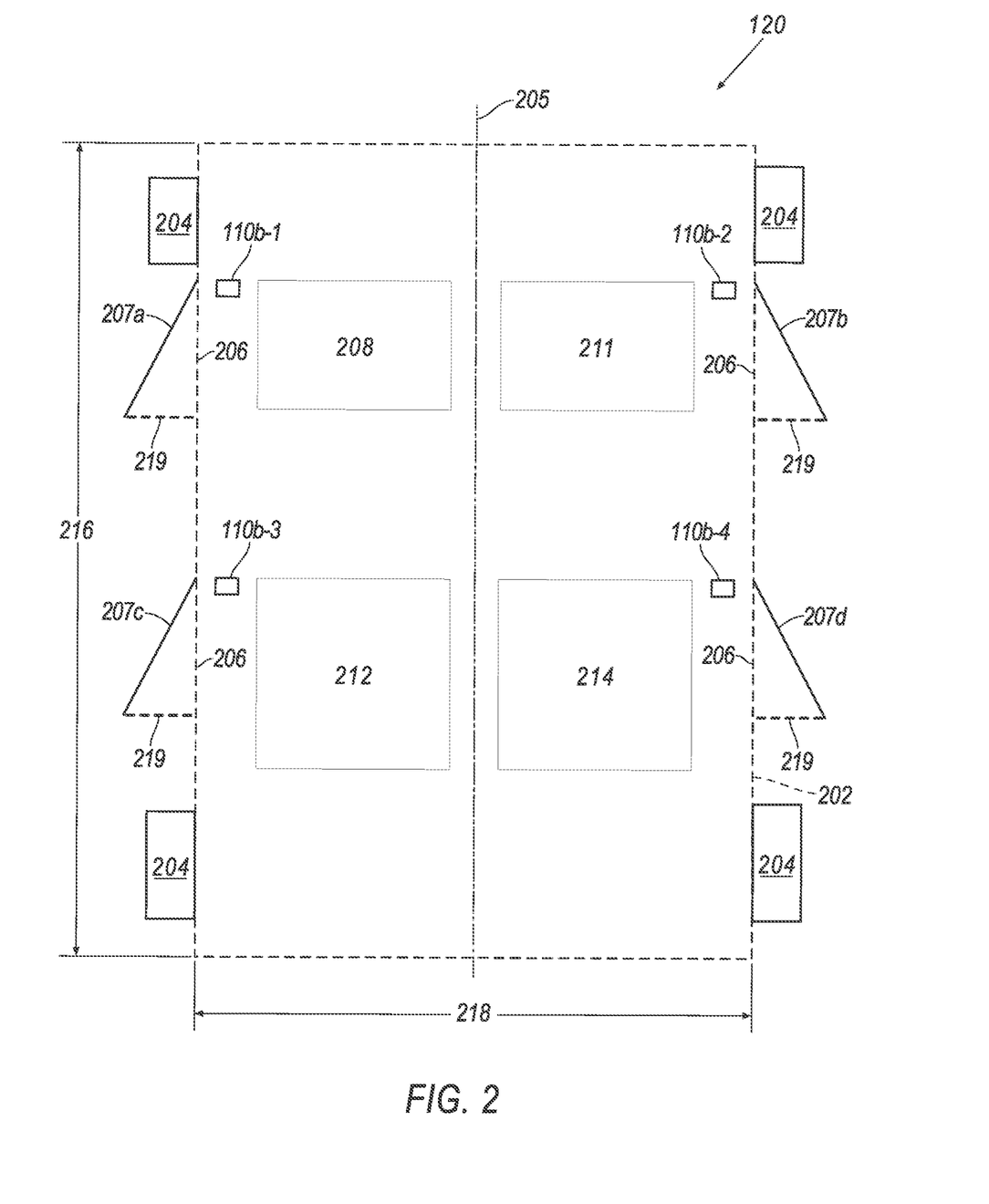
FIG. 2 is a block diagram of an example vehicle in the system of FIG. 1.

FIG. 2 is a block diagram of an example vehicle 120 of system 100 (FIG. 1). The vehicle 120 typically (but not necessarily) is a land vehicle such as a car, truck, etc. The vehicle 120 generally includes a chassis (not shown), a body 202, and wheels 204. The body 202 is arranged on the chassis and substantially encloses components of the vehicle 120. A center longitudinal axis 205 of the vehicle 120 is defined through a center point 210. The center point 210 is defined as a point equidistant from frontmost and rearmost edges of the vehicle 120, and also as equidistant from respective left and right side edges of the vehicle 120. One or more door-openings 206 with corresponding doors 207a through 207d are provided in the body 202. The door-openings 206/doors 207 and door-open distances (also referred to as lateral clearances) 219, i.e., lateral clearances or distances from a side of the vehicle 120, e.g., a distance defined along a line from a specified point in a horizontal plane defined within a door-opening 206 (i.e., "lateral" in this context means perpendicular to a longitudinal axis of the vehicle), are sized to allow doors 207 to open and to accommodate occupant ingress and egress from the vehicle 120. The amount of lateral clearance needed within a parking space 310 for comfortable occupant ingress and egress through each door-opening 206/door 207 and/or for accommodating a door open distance as described below may be a predetermined value specific to each vehicle make and model and/or vehicle type, and/or can be specified by user input for a specific door 207, e.g., certain users such as children or disabled persons may require greater lateral clearances 219. In one implementation, a lateral clearance 219 cannot be less than the needed distance for a door 207 to open to its fullest extension, e.g., as specified by a vehicle 120 manufacturer. Note that doors 207 are shown in the drawings as doors that swing open on a vertical hinge or hinges, but a vehicle 120 could alternatively or additionally include sliding doors and/or doors that open on a horizontal hinge or hinges. In such examples, a lateral clearance 219 could be defined for a door opening 206 of a horizontal or sliding door 207 as described herein, i.e., based on a space needed for the door 207 to open and/or for ingress/egress of occupants and/or articles.

The vehicle 120 can include occupant positions such as a left front seat 208, a right front seat 211, a left rear seat 212, and a right rear seat 214. The vehicle 120 has physical characteristics including a length 216, a width 218, respective door open distances 219 of doors 207a, 207b, 207c, 207d. The seating arrangement, number of possible occupant positions and door-openings (and doors) of the vehicle 120, and the door open distances 219 can vary depending on the specific vehicle make and model and/or vehicle type (e.g., passenger vehicle, sports utility vehicle, truck, crossover, van, minivan, bus, etc.).

Figure 3A:
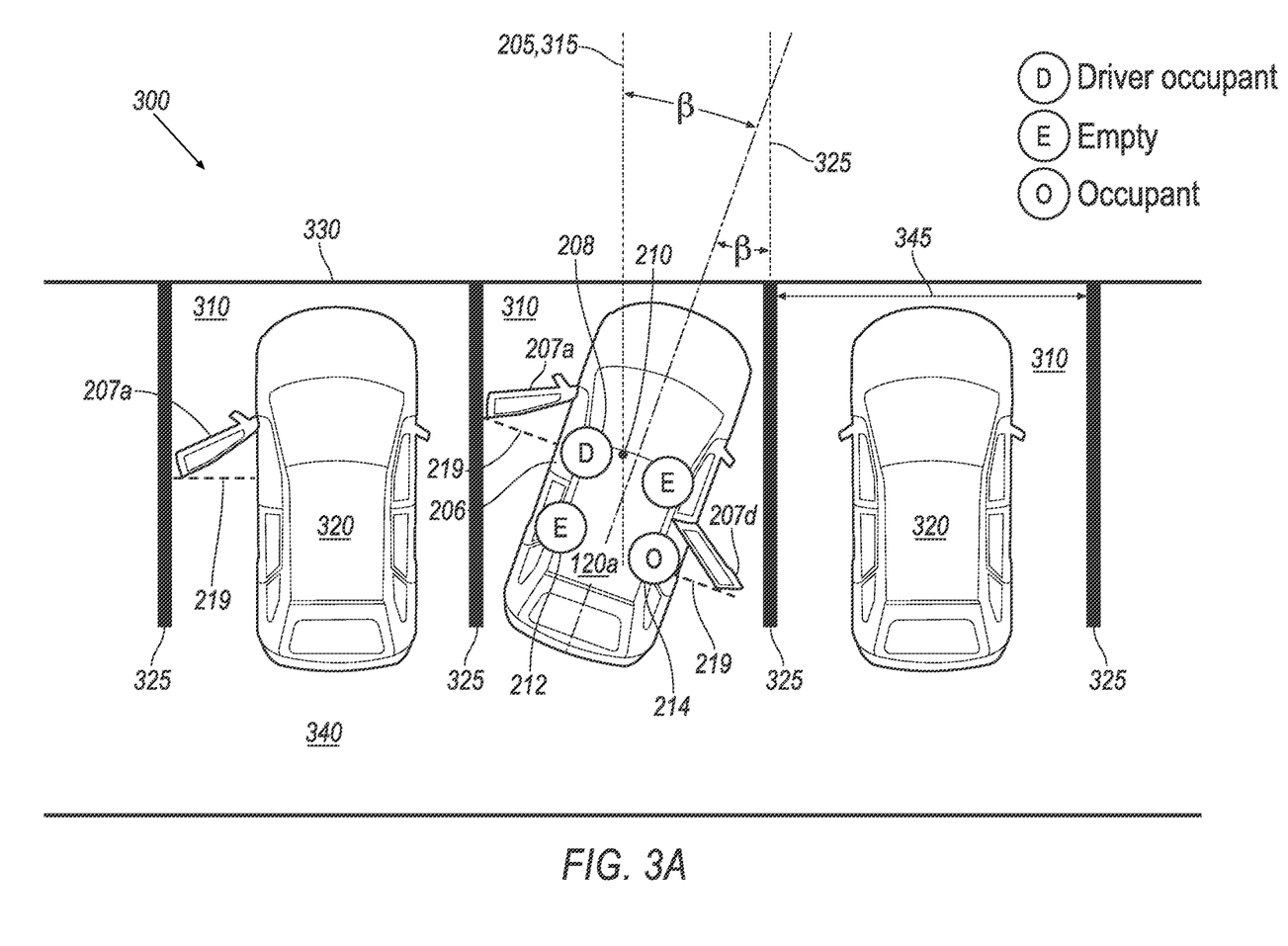
FIG. 3A schematically illustrates an example parking area in which a vehicle has been parked at a biased parking position within a parking space between two adjacent vehicles.
Figure 3B:
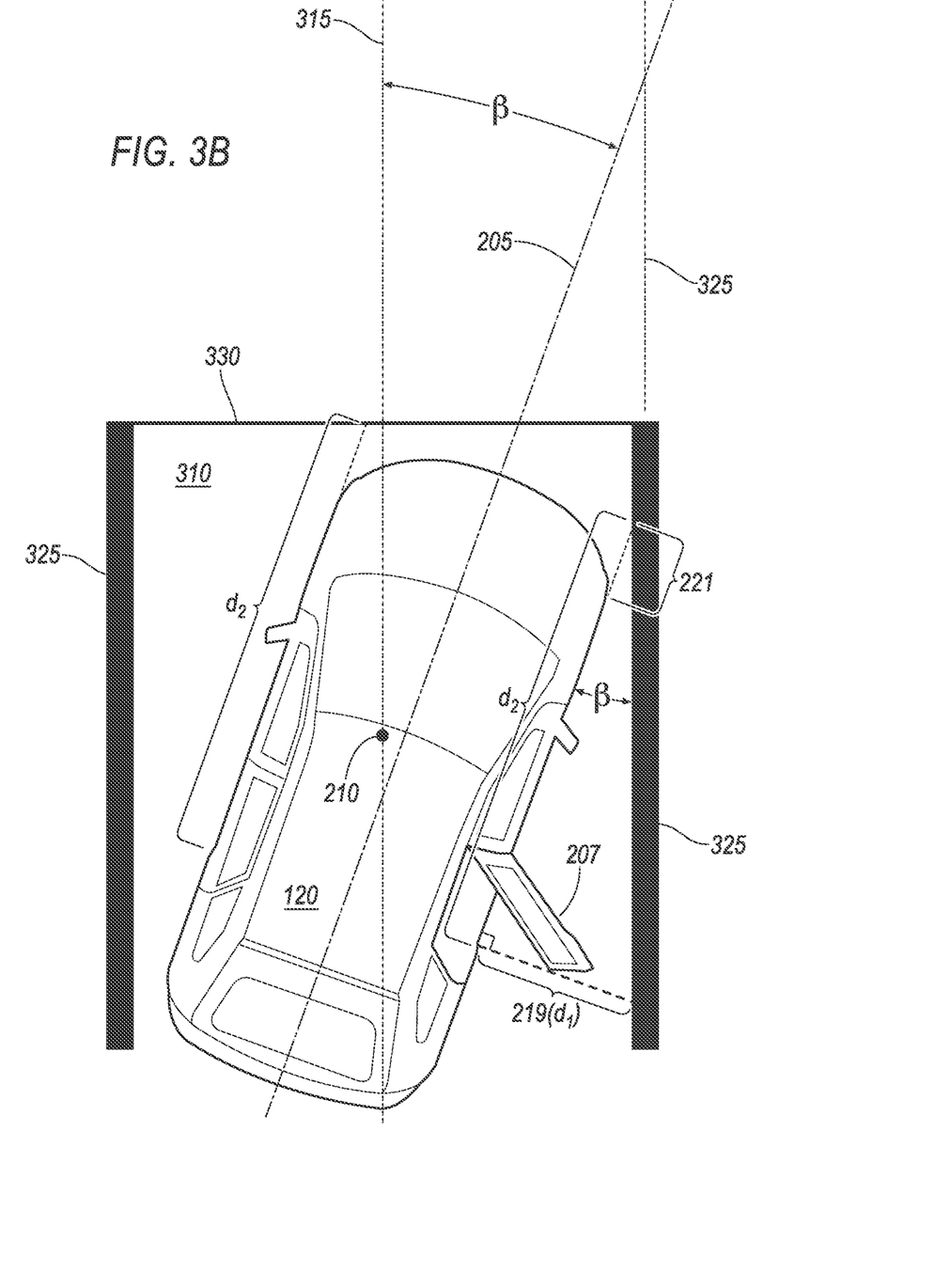
FIG. 3B schematically illustrates an example parking space in the parking area of FIG. 3A in which a vehicle has been parked at a biased parking position within a parking space.
Figure 3C:
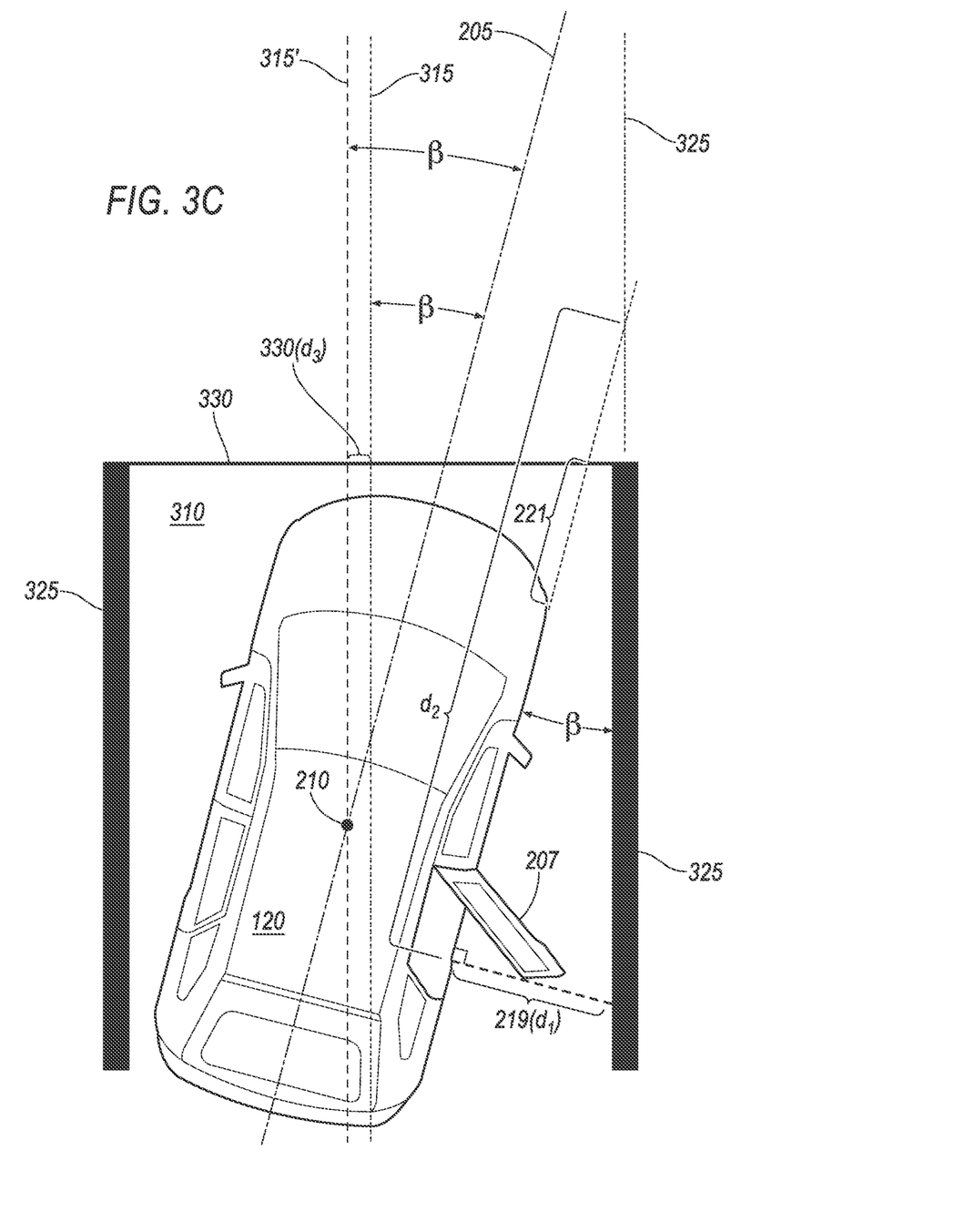
FIG. 3C schematically illustrates an example parking space in the parking area of FIG. 3A in which a vehicle has been parked at a biased and offset parking position within a parking space.
Figure 3D:
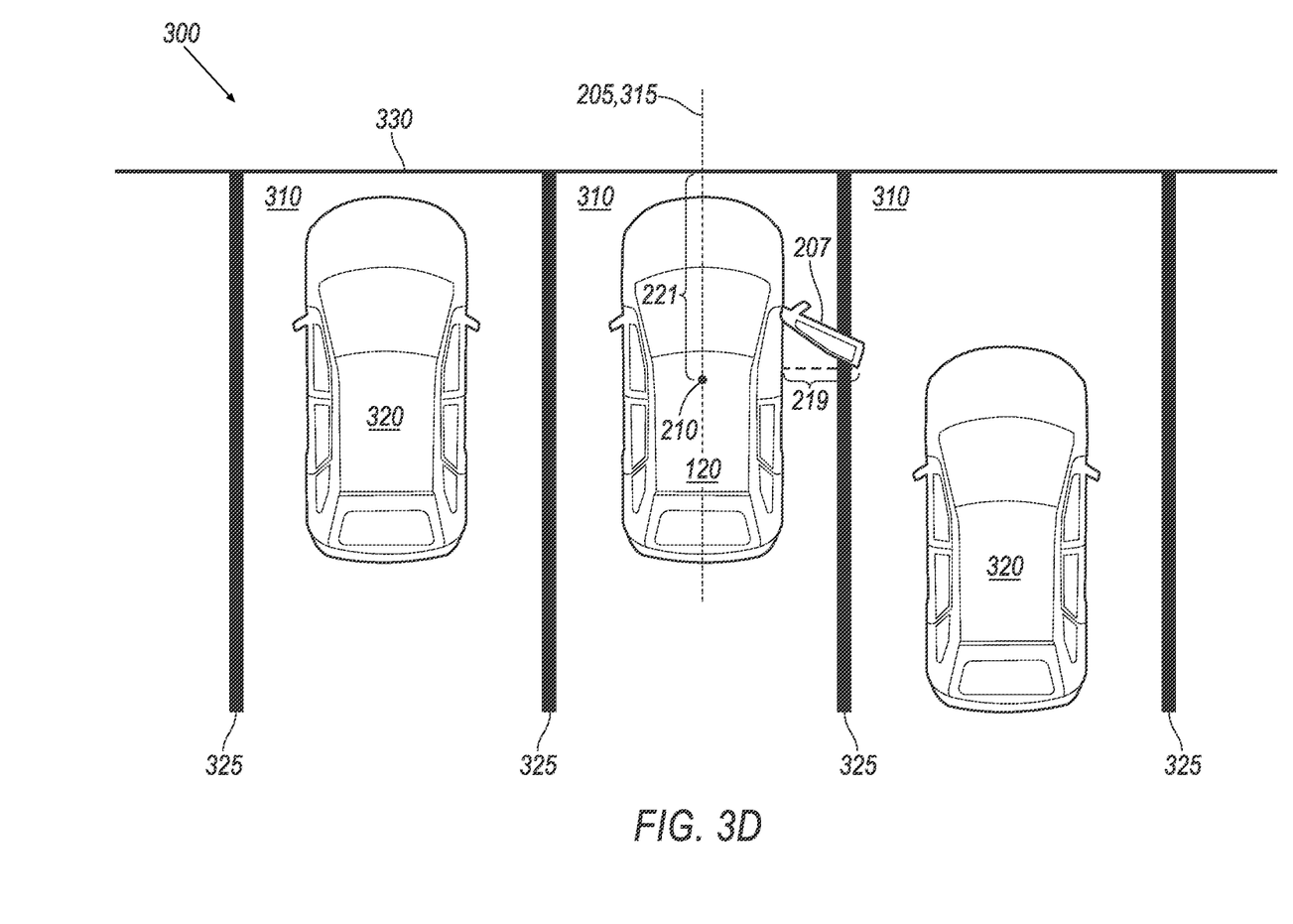
FIG. 3D schematically illustrates example parking spaces in the parking area of FIG. 3A in which a vehicle has been parked at a longitudinal offset parking position within a parking space.

FIGS. 3A, 3B, 3C illustrate an example parking area 300 which each include one or more parking spaces 310 in which vehicles 120 can be parked. The illustrated parking spaces 310 are arranged side to side, perpendicular to an aisle, curb, or wall, but could be arranged at an angle to the aisle, curb, or wall (an acute angle with the direction of approach). Example vehicles 120a-120c may be referred to as "parking vehicles" herein although they are shown in the figures upon completion of a parking procedure. FIG. 3A further illustrates "parked vehicles" 320 adjacent to vehicles 120. As further explained below, the "parking vehicles" 120a-120c are shown as parked at biased (i.e., angled with respect to a longitudinal boundary line 325 and center longitudinal axis 315 of a parking space 310 and/or at a longitudinal offset with respect to a lateral center axis of the parking space 310) parking positions in their respective parking spaces 310. A "biased" parking position is one at which the vehicle 120 is not centered within the parking space 310 and/or is at a non-zero angle $\beta$ with respect to a longitudinal center axis 315 of the parking space 310 as further described below. The adjacent parked vehicles 320 are each parked at a conventional unbiased parking position, e.g., centered and/or at a zero angle (i.e., ($\beta=0$) with respect to a longitudinal axis 315 of a respective adjacent parking space 310. Adjacent parked vehicles 320 may not necessarily be substantially centered and/or at a zero angle with respect to a longitudinal center axis of a respective adjacent parking space 310.

As shown in FIGS. 3A-3C, a parking space 310 can have a left and right sides 325, respectively, as viewed from the perspective of an entry. Longitudinal, i.e., side, boundaries 325 of a parking space 310 can be marked or delineated by a barrier, e.g., by paint, tape, wood, plastic, or concrete berms or barriers, a wall or fence, and/or other conventional markings or barriers. Lateral or end boundaries can include a first (or, typically, a front) lateral boundary line 330, which can be similarly marked and/or determined by a barrier.

As seen in FIGS. 3B and 3C, a lateral clearance 219 can have a distance $d_1$, e.g., a distance in millimeters or centimeters, etc., that is stored in a memory of a computer 105, possible for a specified door 207 and/or occupant. Further, a longitudinal clearance 221 can be defined along a line that is parallel to the longitudinal center axis 205 and that is in the horizontal plane in the door-opening 206 in which the lateral clearance 219 originates. The longitudinal clearance 221 is a distance from a front edge of the vehicle 120 to a front edge 330 or side edge 325 of the parking space 310, i.e., to allow for a desired clearance between the front of the vehicle 120 and a side boundary 325 or a front boundary 330 of a parking space 310. The longitudinal clearance 221 is included in a distance $d_2$ along a line that is defined from the point of intersection with the lateral clearance 219 line to a front edge of the vehicle 120 or, more typically, and as shown in FIGS. 3B and 3C, to a point that is a specified amount of distance forward of the vehicle 120, FIG. 3C further illustrates a lateral offset 330 having a distance $d_3$. The lateral offset 330 can define the distance $d_3$ between the parking space 310 center axis 315 and a parallel, offset axis 315'. The distance $d_3$ can be determined so that the vehicle 120 can be parked in a space 310 to provide a desired longitudinal clearance 219, e.g., in lieu of or in combination with parking the vehicle 120 at a non-zero angle $\beta$ to provide the longitudinal clearance 219.

Figure 4:
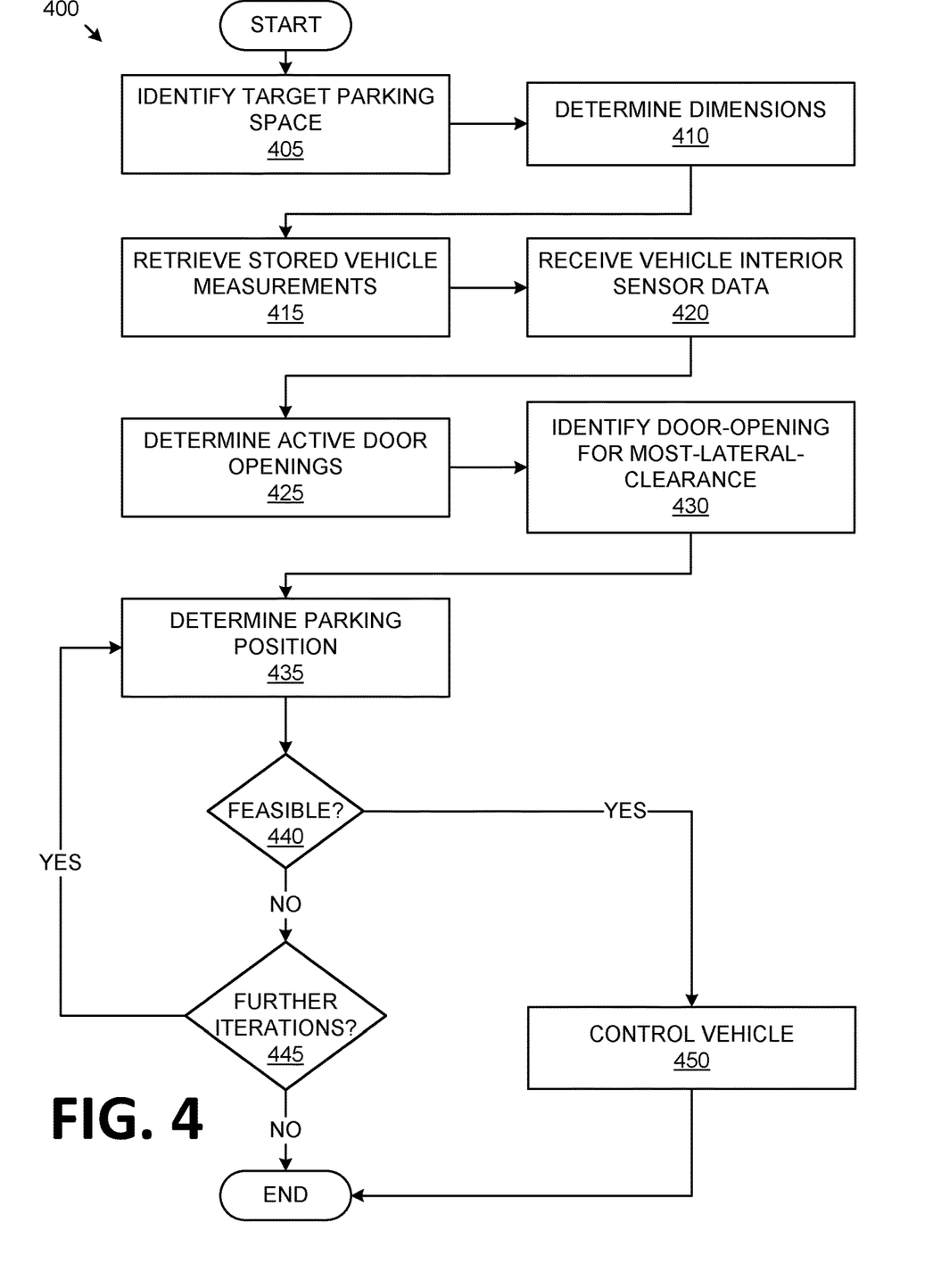
FIG. 4 illustrates an exemplary process for parking a vehicle.

Referring now to FIG. 4, an exemplary process 400 for parking a vehicle 120 within a parking space 310 at a biased parking position is illustrated. For convenience, the process 400 is described herein as carried out by (i.e., program instructions for the process 400 could be stored in a memory and executable by a processor of) the computer 105, but it is to be understood that some or all of the operations described herein could alternatively or additionally be carried out by a different computer such as a controller dedicated to a function such as parking. Thus, as explained previously, the computer 105 can be part of a park assist system 122 of the vehicle 120 or a separate computer 105 communicatively connected to the park assist system 122.

The process 400 begins in a block 405, when the vehicle 120 identifies an available parking space 310 in a parking area 300. For example, the computer 105 can receive input, e.g., via a vehicle 120 human machine interface (HMI) or the like from a vehicle 120 human operator who visually locates a parking space 310 and provides the input initiating the system 100 to park the vehicle 120 in the parking space 310. Alternatively or additionally, the vehicle 120 could be fully autonomous, and the computer 105 could include programming to identify a target parking space 310, and to park the vehicle 120 according to the process 400.

Next, in a block 410, the computer 105 determines parking space 310 dimensions, i.e., a length and width, based on the boundaries 315, 325. For example, the space 310 width could be an extent of a front boundary 330, and the space 310 length could be an extent of side boundaries 325. The computer 305 may also determine a lateral distance between vehicles 320 adjacent (i.e., immediately next to) the parking space 310. For example, a computer 105 can determine a location (e.g., geo-coordinates according to the Global Positioning System as is known) that can be used, e.g., with reference to map data stored by the computer 105 and/or received from a server 130, for determining parking space 310 dimensions. Alternatively or additionally, the computer 105 can receive sensor data from one or more vehicle sensors 110a having a fields of view including the exterior of the vehicle, including the parking space 310, e.g., cameras, lidar, etc. can be used in a conventional manner to determine dimensions of the parking space 310, as well as to identify objects such as other vehicles, obstacles, walls, barriers, etc.

Next, in a block 415, the computer 105 of vehicle 120 retrieves stored measurements describing the vehicle 120, e.g., dimensions or distances such as the length 216, the width 218, and the clearances 219 of each of the doors 207a-207d may be stored in the data store 106. The longitudinal clearance 221 can likewise be stored. As noted above, different clearances 219 can be stored for respective doors 207a-207d.

Further, stored measurements with respect to various clearances 219 can be specified by a vehicle 120 manufacturer, by user input for all users of the vehicle 120, and/or by user input specifying measurements for one or more specific users of the vehicle 120. For example, a vehicle occupant (or another individual) can specify, via a vehicle 120 a human machine interface (HMI) or the like, a clearance 219 for a door 207, for greater lateral clearance 219 at one or more door-openings 206 (associated with a respective door 207) based on vehicle 120 use, etc., e.g., based on a particular seat position is occupied more often than one or more of the other seating positions, occupied by a person needing extra room for egress and/or ingress, etc.

For example, referring again to vehicle 120a shown in FIG. 3A, there may be a stored preference for the door-opening 206 adjacent the occupied front left seat 208 and the door-opening 206 adjacent the right rear seat 214 to each have greater lateral clearance than the door-openings 206 adjacent the unoccupied right front seat 211 and the unoccupied left rear seat 212. In another example, there could be a preference for a vehicle 120 driver to be as centered as possible when both the driver door and front passenger door open, i.e., for equal lateral clearances 219 at respective doors 207a, 207b. In another example, it might be contemplated, and a preference could be stored, that a driver door 207a and a right rear passenger door 207d will be open, and that a minimum clearance 219 is desired at the right rear door 207d, e.g., to allow a car seat to be placed in and/or taken out of the vehicle 120. Other occupant seating arrangements and preferences are, of course, possible. A user can specify such preferences via input to the computer 105, e.g., via a vehicle 120 HMI, e.g., specifying a lateral clearance 219 required for a particular door 207, specifying a door 207 with a passenger having special needs, e.g., wheelchair or car seat, whereupon the computer 105 could retrieve a stored lateral clearance to be applied to that door 207, etc.

Next, in the block 420, the computer 105 receives sensor data from one or more vehicle sensors 110b that sense conditions in the interior of the vehicle 120.

Then, in a block 425, the computer 105 determines one or more active door-openings 206 within the vehicle 120 (e.g., vehicle 120a of FIG. 3) based on the sensor 110b data. An active door-opening 206 is a door opening 206 to be used for vehicle 120 ingress or egress once the vehicle 120 is parked. Active door openings can be determined according to a seating position (e.g., left front, right front, left rear, right rear) of an occupant and/or an article, e.g., to be loaded and/or unloaded to and/or from the vehicle 120. For example, sensors 110b-1 through 110b-4 (FIG. 2) can be cameras, sensors that detect whether a seat belt is engaged, weight sensors, etc., such as are known for use in determining that an occupant seat in vehicle 120 is occupied or is unoccupied. Occupant location can additionally or alternatively be determined using data about a vehicle 120 ignition state, i.e., whether the ignition of the parking vehicle 120 is in an on state, or any other available data indicating which seating positions are occupied. When the vehicle 120 is operated in a manual (non-autonomous) mode, a vehicle ignition state of ON is deemed to mean that an occupant is present in a vehicle 120 driver's seat.

Next, in a block 430, the computer 105 determines a door 207 of the vehicle 120 to be provided the greater lateral clearance 219 (i.e., a maximum required clearance) relative to other doors 207 when the vehicle 120 is parked within the parking space 310, based on the stored preference and/or the occupant location, and determines a value (e.g., in centimeters) for that clearance 219. The determination of occupant location within the vehicle 120 determines which door-opening(s) 206/door(s) 207 require greater lateral clearance relative to other door-opening(s) 206/door(s) 207, with the door-opening/door adjacent a particular seating position considered as requiring the greater lateral clearance. Referring again to example vehicle 120a of FIG. 3A, in which the left front seat 208 and the right rear seat 214 are occupied and the right front seat 211 and the left rear seat 212 are unoccupied, the door-openings 206/doors 207 adjacent the left front seat 208 and the right rear seat 214 are determined to require greater lateral clearance relative to the door-openings 206/doors 207 adjacent the unoccupied seating positions 211, 212. That is, a stored preference could be retrieved based on detecting occupant location, e.g., via sensors 110 as discussed above, so a vehicle 120 user advantageously does not have to select a parking bias option at each and every instance of parking the vehicle 120.

As explained above, the amount of lateral clearance needed within a parking space 310 for comfortable ingress and egress through each door-opening 206/door 207 can be a predetermined value, specific to each vehicle make and model and/or vehicle type. The amount of lateral clearance needed on one or both sides of the parked vehicle 120 at a door-opening 206/door 207 can also be specified by stored preferences such as mentioned above, e.g. for a vehicle occupant needing assistance for ingress/egress (e.g., a child, handicapped occupant, etc.) and/or by an article needing to be loaded and/or unloaded through the door-opening. Further, the computer 105 can store, e.g., in a table or the like, minimum lateral clearances for respective door-openings 206, i.e., for seating positions in a vehicle 120 for occupant ingress and egress, i.e., the example minimum lateral clearances are effectively maneuvering clearances for the occupant at a side of the vehicle, for occupant ingress and/or egress). The minimum lateral clearance needed for each door-opening/door can be received and stored in the data store 106 and transmitted to the computer 105 for use in determining the biased parking position.

Next, in a block 435, the computer 105 determines a parking position in the parking space 310 for the parking vehicle 120 based on the parking space 310 dimensions, the vehicle dimensions, and the maximum clearance 219 determined in the block 430. A "parking position" means that the vehicle 120 is (or will be) parked at an angle β between the vehicle axis 205 and the longitudinal axis 315 (and to a boundary line 325 parallel to the axis 315) of the parking space 310 and/or with a lateral offset 330 between a parking space 310 center axis 315 and an offset axis 315'. A parking position can also specify a longitudinal direction at which a vehicle 120 is oriented in the parking space 310, e.g., a "forward" parking position can mean that a front edge or bumper of the vehicle 120 is closer to the front boundary 330 of a parking place 310 than a rear edge or bumper of the vehicle 120; a "rearward" or "reverse" parking position can mean that a rear edge or bumper of the vehicle 120 is closer to the front boundary 330 of a parking place 310 than a front edge or bumper of the vehicle 120. This, one or both of a rearward for forward parking position can be considering in determining a parking position, e.g., in determining a bias angle β, position of the center point 210, and/or longitudinal offset 221, e.g., as further described below, both forward and rearward orientations of the vehicle 120 can be considered.

To determine the parking position, the computer 105 can use the clearances 219, 221. For example, the computer 105 can determine, if the vehicle 120 center point 210 is on the parking space center axis 315 (e.g., at a specified distance from a front boundary 330, e.g., a distance that is one-half a length of the vehicle 120 plus a specified distance, e.g., ½ meter), the required lateral clearance 219 (i.e., a distance $d_1$) will be provided from the specified door-opening 206 to a side 325 or the parking space 310 or, alternatively, to a side of a vehicle 320 in an adjacent parking space 310 (FIGS. 3B and 3C show the distance $d_1$ to a side 325 of the parking space 310 for ease of illustration). If so, then the vehicle 120 can be parked in the space 310 with no lateral offset 330 and at a substantially zero angle β. However, if, based on dimensions (e.g., typically, widths) of the parking space 310 and vehicle 120, parking with no lateral offset 330 and at a substantially zero angle β will not provide the desired lateral clearance 319, the computer 105 can determine a nonzero angle β at which to park the vehicle 120. For example, the computer 105 can iteratively test various values for β by assuming a right triangle with one side being the lateral clearance 219 having the distance $d_1$. Then tan $β=d_1/d_2$.

From this, a value for $d_2$ can be determined. The computer 105 can then evaluate whether, for the value of β currently being tested, the distance $d_2$ is greater than a portion of vehicle 120 length from the clearance 219 to a corner of the vehicle 120, i.e., whether a longitudinal clearance 221 can be provided. If not, then the computer can test further, typically successively larger, values for the angle β.

Moreover, if no value for the angle β will provide the required clearance 219, then the computer 105 can test whether a nonzero offset 330 will provide the required clearance 219, possibly in combination with a nonzero angle β. For example, the computer 105 can iteratively test various offsets 330 in succession, e.g., 10 cm, 20 cm, etc., and possibly also various angles β at each successive offset 330, until finding an offset having a distance $d_3$ permitting, possibly in combination with a nonzero angle β, the vehicle 120 to park achieving the desired clearance 219. FIG. 3C shows a vehicle 120 parked at a bias, i.e., a nonzero angle β, as well as at a nonzero lateral offset 330.

The output of the block 435 is thus an angle β, which can be zero, positive, or negative and/or a lateral offset 330. For example, a positive value for β can indicate that a vehicle 120 is to be biased to the right, e.g., as shown in FIGS. 3A-3C, and a negative value can indicate that a vehicle 120 is to be biased to the left, while a zero value can indicate that the vehicle 120 is to be aligned with its axis 205 sharing and/or parallel to the parking space 310 axis 315. Likewise, in the illustrated example, a positive value for the lateral offset 330 can indicate a distance of the offset axis 315' to the right of the parking space 310 center axis 315, while a zero value indicates that the offset axis 315' and the parking space center axis 315 are a same line, and a negative value for the lateral offset 330 indicates a distance to the left of the center axis 315 of the offset axis 315' parallel thereto, e.g., as in the example of FIG. 3C.

The output of the block 435 could further specify a distance of the vehicle center point 210 from a front boundary 330 of the parking space 310. For example, the computer 105 could compare a length 216 of the vehicle 120 to a measured depth of the parking space 310, e.g., a distance to a wall or barrier at the boundary 330, and/or a length of a side boundary 325, e.g., painted on a surface, terminating at the boundary 330, etc., to determine a distance of the center point 210 from the boundary 330. That is, the computer 105 could be programmed, based on an expected depth or length of a parking space 310, to specify a distance of the center point 210 of the vehicle 120 from the boundary 330. Further, with reference to FIG. 3D, a distance of the center point 210 from the boundary 330 could be specified, where β could (but is not necessarily) zero, according to a desired longitudinal offset from a parking space 310 front boundary 330 so that a door opening 207 is positioned to provide a desired lateral clearance 219 without interference from an adjacent vehicle 320. For example, vehicle 120 sensors, e.g., cameras, ultrasound, etc., can detect a front edge of an adjacent vehicle 320 as well as the front boundary 330 and can then determine a longitudinal offset 221 of the vehicle 120 center point 210 from the front boundary 330 such that the longitudinal offset provide for the door 207 to open without striking the vehicle 320, and allows the required lateral offset 219 for a user to exit and/or enter the vehicle 120 via the door 207.

Following the block 435, the process 400 proceeds to a block 440. In the block 440, the computer 105 determines whether the parking position specified in the block 435 is feasible. In this context, feasibility, i.e., whether a parking position is feasible, means a determination by the computer 105 that the vehicle 120 can be parked in the parking space 310 according to the specified parking position, e.g., at the specified angle β and/or offset 330, with the vehicle 120 center point 210 at a specified distance from the boundary 330 without violating one or more constraints. Two such constraints can be that the vehicle 120 can be parked providing the distances $d_1$ and $d_2$ discussed above. Further, a constraint could be that the vehicle 120 can be parked so as to avoid protruding into a travel lane, typically at an end opposite the front boundary 330. For example, the computer 105 could be programmed to determine, based on the specified or default distance of the center point 210 from the boundary 330, to determine whether, when the vehicle 120 is parked at a bias, i.e., the angle β, a corner of the vehicle will extend beyond a length of the parking space 310. The computer 105 could then, if so, determine that the parking position is not feasible, and the process 400 could proceed to a block 445 two test for a possible return to the block 435, in which, a different distance of the center point 210 from the boundary 330, e.g., a closer distance, could be specified, and/or the computer 105 could specify a parking position with a different bias and/or lateral offset 330, which parking position could then be tested against constraints in the block 440. If the parking position is determined to be feasible, then the process 400 proceeds to a block 450.

In the block 445, the computer 105 determines whether to perform further iterations of the block 435 to determine a further parking position that can be tested for feasibility. For example, the computer 105 could be programmed to stop at a parking space 310 for no more than a specified amount of time, e.g., 20 seconds, 30 seconds, etc., to avoid blocking other vehicles, or to proceed away from a parking space 310 upon detecting that other vehicles are blocked, etc. Further, the computer 105 may be programmed to determine that all possible parking positions have been considered and deemed unfeasible. If further iterations are not possible, then the process 400 ends following the block 445. Otherwise, the process 400 returns to the block 435.

In the block 450, which may follow the block 440, the computer 105 of the vehicle 120 controls vehicle 120 components 124, e.g., according to known algorithms and/or techniques for autonomously maneuvering and/or parking a vehicle, whereby the vehicle 120 is maneuvered into the parking space 310 at the determined parking position. The computer 105 can alternatively or additionally provide output, e.g., via an HMI, to a human operator with an instruction specifying the parking position. The process 400 ends following block 450.

As used herein, the term "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above and are accessed via a network in any one or more of a variety of manners. A file system may be accessible from a computer operating system and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The terms "first" and "second" should not be construed to recite only two. The phrase "based on" encompasses being partly or entirely based on.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computing device comprising a processor and a memory, the memory storing instructions executable by the processor such that the computing device is programmed to:
   identify a parking space;
   identify a lateral clearance when a vehicle is parked in the parking space based on identifying a first door of the vehicle to be provided the lateral clearance when the vehicle is parked;
   determine a parking position of the vehicle in the parking space, including a parking bias angle β between a vehicle longitudinal axis and a parking space longitudinal center axis, and a lateral offset of the vehicle with respect to the parking space longitudinal center axis, based on dimensions of the parking space and the lateral clearance; and
   actuate one or more components in the vehicle in response to determining the parking position.

2. The computing device of claim 1, further programmed to determine the dimension of the parking space from vehicle sensor data detecting a longitudinal boundary of the parking space.

3. The computing device of claim 2, further programmed to determine the parking bias angle β based on detecting an object on a different side of the longitudinal boundary of the parking space from a side of the longitudinal boundary of the parking space in which the vehicle is to be parked.

4. The computing device of claim 1, wherein the lateral clearance is specified for one of a plurality of door-openings in the vehicle.

5. The computing device of claim 1, further programmed to determine the lateral clearance based on a door-opening distance selected from a plurality of door-opening distances.

6. The computing device of claim 1, further programmed to determine the lateral clearance based on at least one of a stored user preference or an occupant location within the vehicle.

7. The computing device of claim 1, further programmed to determine the angle β based on a ratio of the lateral clearance to a longitudinal distance that is based on a length of the vehicle and a longitudinal clearance.

8. The computing device of claim 7, wherein the longitudinal distance is calculated as the sum of (1) a distance from a portion of the length of the vehicle extending from a point shared with the lateral clearance to a front or rear edge of the vehicle and (2) the longitudinal clearance.

9. The computing device of claim 8, wherein a line including the longitudinal distance is perpendicular to a line including the lateral clearance.

10. The computing device of claim 7, wherein a line including the longitudinal distance is parallel to a longitudinal axis of the vehicle.

11. The computing device of claim 1, further programmed to determine the angle β based on iteratively determining respective ratios of respective lateral clearances and longitudinal distances.

12. The computing device of claim 1, wherein one of the angle β is nonzero and the lateral offset is zero.

13. The computing device of claim 1, wherein the parking position includes parking vehicle one of front-first and rear-first in the parking space.

14. The computing device of claim 1, further programmed to actuate the one or more components in the vehicle to park the vehicle at the parking position.

15. A method, comprising:
   identifying a parking space;
   identifying a lateral clearance when a vehicle is parked in the parking space based on identifying a first door of the vehicle to be provided the lateral clearance when the vehicle is parked;
   determining a parking position of the vehicle in the parking space, including a parking bias angle β between a vehicle longitudinal axis and a parking space longitudinal center axis, and a lateral offset of the vehicle with respect to the parking space longitudinal center axis, based on dimensions of the parking space and the lateral clearance; and
   actuating one or more components in the vehicle in response to determining the parking position.

16. The method of claim 15, further comprising determining the dimension of the parking space from vehicle sensor data detecting a longitudinal boundary of the parking space.

17. The method of claim 16, further comprising determining the parking bias angle $\beta$ based on detecting an object on a different side of the longitudinal boundary of the parking space from a side of the longitudinal boundary of the parking space in which the vehicle is to be parked.

18. The method of claim 15, further comprising determining the angle $\beta$ based on a ratio of the lateral clearance to a longitudinal distance that is based on a length of the vehicle and a longitudinal clearance.

19. The method of claim 18, wherein the longitudinal distance is calculated as the sum of (1) a distance from a portion of the length of the vehicle extending from a point shared with the lateral clearance to a front or rear edge of the vehicle and (2) the longitudinal clearance.

20. The method of claim 19, wherein a line including the longitudinal distance is perpendicular to a line including the lateral clearance.

* * * * *